(12) United States Patent
Krziwanek et al.

(10) Patent No.: US 8,859,682 B2
(45) Date of Patent: Oct. 14, 2014

(54) PACKAGING ELEMENT

(75) Inventors: Thomas Krziwanek, Wels (AT); Klaus Brzezowsky, Marchtrenk (AT)

(73) Assignee: Teufelberger Gesellschaft m.b.H., Wels (AU)

( * ) Notice: Subject to any disclaimer, the term of this patent is extended or adjusted under 35 U.S.C. 154(b) by 159 days.

(21) Appl. No.: 13/135,101

(22) Filed: Jun. 24, 2011

(65) Prior Publication Data
US 2011/0319565 A1 Dec. 29, 2011

(30) Foreign Application Priority Data
Jun. 25, 2010 (AT) ................. A 1083/2010

(51) Int. Cl.
*C08L 67/02* (2006.01)
*B65D 63/10* (2006.01)
*C08L 69/00* (2006.01)

(52) U.S. Cl.
CPC ............... *C08L 67/02* (2013.01); *B65D 63/10* (2013.01); *C08L 69/00* (2013.01)
USPC ..... 525/165; 428/156; 428/339; 428/355 EN; 428/483; 525/445

(58) Field of Classification Search
USPC ............ 525/165, 445; 428/156, 339, 355 EN, 428/483
See application file for complete search history.

(56) References Cited

U.S. PATENT DOCUMENTS

| 3,651,196 | A  | 3/1972  | Starkweather, Jr. |
| 4,130,686 | A  | 12/1978 | Takahashi et al.  |
| 6,214,269 | B1 | 4/2001  | Fujita et al.     |
| 2005/0238897 | A1 | 10/2005 | Rigney et al. |
| 2008/0071009 | A1 | 3/2008  | Simon             |

FOREIGN PATENT DOCUMENTS

| CA | 889808 | 1/1972 |
| DE | 20 37 398 | 2/1971 |
| DE | 20 29 105 | 12/1971 |
| DE | 27 27 356 | 12/1977 |
| EP | 0 894 829 | 2/1999 |
| WO | WO 03/066704 | 8/2003 |
| WO | WO 03/087200 | 10/2003 |

OTHER PUBLICATIONS

BASF 1, Polystyrene and Styrolux product data sheet, p. 1-48, 2010; accessed via the Internet, retrieved Feb. 26, 2013; URL:<http://www.styrolution.net/wa/steu~es_ES/function/conversions:/publish/common/upload/general_purpose_styrenics/Polystyrol_Styrolux_brochure. pdf>.*
BASF 2, Styroflex product data sheet, p. 1-2, ; accessed via the Internet, retrieved Feb. 26, 2013; URL:<http://www.packaging.basf.com/p02/Packaging/en/function:pi:/wa/Packaging~en_GB/prodline-info.pdf?wcms-pi=get&pl=styroflex>.*
BASF 3, Polystyrol 147F product data sheet, p. 1-2, ; accessed via the Internet, retrieved Feb. 26, 2013; URL:<http://keezmrc.basf-korea.co.kr/02_products/01_thermoplastics/msds/ps/147F_e.PDF>.*
ILPA, Polystyrene product data sheet, p. 1-2; accessed via the Internet, retrieved Feb. 26, 2013; URL:<http://www.ilpa-mp3.com/pdf/l%2Oprodotti_lastre_PS_engl.pdf>.*
International Search Report of PCT/AT2011/000280, dated Dec. 21, 2011.
PFERD Tools for Use on Plastics, downloaded on Jun. 4, 2013 from http://www.pferd.com/images/Praxis_Kunststoff_72dpi_en.pdf.
K•Resino® Styrene Butadiene Copolymers, The Smart Choice™, TIB 202, Injection Molding, dated Mar. 2011, downloaded on Jun. 4, 2013 from http://www.cpchem.com/bl/kresin/en-us/Documents/LiteratureK-ResinTIB202.pdf.

* cited by examiner

*Primary Examiner* — Robert Jones, Jr.
(74) *Attorney, Agent, or Firm* — Collard & Roe, P.C.

(57) ABSTRACT

The invention relates to a tape-like packaging element made from a polyester-based plastic tape, the plastic tape comprising at least one splicing inhibitor, wherein the splicing inhibitor is a thermoplastic, styrene-based polymer.

16 Claims, 2 Drawing Sheets

PACKAGING ELEMENT

CROSS REFERENCE TO RELATED APPLICATIONS

Applicants claim priority under 35 U.S.C. §119 of Austrian Application No. A 1083/2010 filed on Jun. 25, 2010, the disclosure of which is incorporated by reference.

The invention relates to a tape-like packaging element, in particular a strapping tape or harvesting twine made from a polyester-based plastic tape, wherein at least one splicing inhibitor is contained in the plastic tape.

Strapping tapes are usually made of polyesters or polyolefins in an extrusion process and subsequently stretched. Owing to the alignment of the molecules during the stretching process they have a predisposition to splicing, i.e. the formation of tears in tape direction. Owing to the embrittlement of plastics at lower temperatures, in particular below 5° C., the splicing tendency is increased further. To reduce the splicing tendency splicing inhibitors are usually added to the compounds for producing strapping tapes. Previously used splicing inhibitors have not helped sufficiently to reduce embrittlement at low temperatures.

From WO 03/087200 A1 a packaging tape is known, which consists up to more than 92 wt. % of a polyester and less than a total of 8 wt. % of an additive with a polyolefin base and additional additives, wherein the proportion of polyolefin additive is less than 3 wt. %. As additional additives also polystyrene-based elastomers are used in a proportion of between 0.5 wt. % and 2 wt. %. By adding polyolefin the longitudinal predisposition to splicing should be reduced. Likewise the styrene elastomers are intended to contribute to a reduction of this splicing tendency.

The use of styrene-butadiene rubber in proportions of up to 25 wt. % in a polyethylene band is also known from DE 20 37 398 A1, although in this document the purpose of the additive is not indicated.

DE 27 27 356 A1 describes a binding tape which is made from a heat-curable and thermoplastic resin, wherein the resins are derived from the same monomers, so that the two resins have a chemical affinity to one another, and wherein the heat-curable resin is an unsaturated polyester resin cross-linked with styrene. The thermoplastic resin can be an acrylonitrile-butadiene-styrene-mixed polymerizate or an acrylonitrile-styrene-mixed polymerizate. In this way a binding tape of sufficient strength should be produced which is comparable with a steel band, which has high tensile strength and low expansion as well as low creep behavior, and which can be joined easily and securely at the ends. In this case the thermoplastic resin forms the outer layer of the binding tape and the heat-curable resins forms the core.

The objective of the present invention is to create a tape-like packaging element, which even at lower temperatures has a reduced tendency to splicing.

This objective is achieved on the one hand by the aforementioned tape-like packaging element, which contains a thermoplastic, styrene-based polymer as the splicing inhibitor, and independently of this by the use of a styrene-based polymer as the splicing inhibitor for a polyester-based strapping tape or harvesting twine.

Surprisingly, it has been established that by using thermoplastic styrene-polymers, i.e. not elastomeric polymers, as embrittlement inhibitors to reduce the splicing sensitivity of packaging tapes, in particular strapping tapes or harvesting twine, not only is this property reduced, but also its use is improved at low application temperatures by reducing the embrittlement tendency of the tape-like packaging element.

The term "low application temperature" is defined as a temperature of below 5° C., whereby naturally a limit is set at low temperatures conditional to the material.

In this connection polymers or mixed polymerizates have proved to be particularly suitable as splicing inhibitors, which are selected from a group comprising or consisting of polystyrene homopolymer, styrene-butadiene-copolymer (SB), acrylonitrile-butadiene-styrene copolymer (ABS), methyl-methacrylate-acrylonitrile-butadiene-styrene copolymer (MABS), styrene-acrylonitrile copolymer (SAN), acrylonitrile-styrene-acrylate copolymer (ASA), styrene-maleic acid anhydride copolymer (SMA), acrylonitrile-ethylene-styrene copolymer (AES), acrylonitrile-chlorinated polyethylene-styrene (ACS), methyl-methacrylate-butadiene-styrene (MBS), styrene-α-methyl styrene copolymer (SAM) as well as mixtures thereof. The reason for their particular suitability could only be verified hitherto by tests. There is not yet a molecular level explanation for this.

Preferably, the proportion of styrene-based polymer in the plastic tape is selected from a range with a lower limit of 0.2 wt. % and an upper limit of 20 wt. %, in particular 5 wt. %. Below 0.2 wt. % the splicing reduction is too low. Above 20 wt. % the proportion of the base polymer is reduced so far that the packaging tape has worse properties with respect to its tensile strength.

Advantageously, the polyester is a thermoplastic polyester, in particular a saturated polyester, whereby according to one embodiment variant the polyester is selected from a group comprising or consisting of polyethylene terephthalate (PET), polybutylene terephthalate (PBT), polycarbonate (PC), polyethylene naphthalate (PEN) as well as mixtures thereof. In particular, said polyesters are characterized by having very positive mechanical properties, such as e.g. rigidity, hardness, abrasion resistance, dynamic and thermal loadability, i.e. properties which are valuable with respect to packaging tapes. In addition, with respect to the styrene-based polymers positive interactions were observed.

According to one embodiment variant of the polyester-based packaging element the latter is completely free of polyolefin or contains less than 8 wt. %, in particular less than 0.2 wt. % polyolefin(s). In this way a reduction in the tensile strength and the hardness of the plastic tape is also avoided.

It is also possible that the packaging element in addition to the styrene-based splicing inhibitors contains at least one additional different splicing inhibitor in the plastic tape, which is selected in particular from a group comprising or consisting of olefin-acrylate-copolymers, thermoplastic polymers (TPE), low density polyethylene (LDPE), linear LDPE (LLDPE), polyethylene, polypropylene, butadiene rubber (BR), as well as mixtures thereof. In this way the profile of properties of the packaging element can be adjusted more effectively and finely to the respective area of application.

In this case it has proved to be advantageous if the additional splicing inhibitor is contained in a proportion such that the ratio of styrene-based splicing inhibitor to additional splicing inhibitor is selected from a range of from 80:20 to 20:80, in particular 60:40 to 40:60. In this way a reduction in the effect of the styrene-based splicing inhibitor is avoided with a high degree of reliability, which is significant in particular with respect to the production method of the tape-like packaging element in changing conditions of production.

It has proved to be particularly advantageous with respect to the reduction of brittle fractures if the styrene-based polymer in the plastic tape is unattached and/or domain-like, whereby it is preferable if the domains are stretched in at least one spatial direction, the latter having in particular in at least one spatial direction an at least almost elliptical cross section. In particular, according to one embodiment variant the binding forces between the domain and the surrounding matrix are weaker than the binding forces inside the matrix and inside the domain. By avoiding the chemical crosslinking of the base polymer with the molecules of the splicing inhibitor, whereby the latter are unattached within the meaning of the invention, a change in the tensile strength is avoided, whereby the domain-like embodiment acts as an area in which tears "fizzle out". The stretched, in particular at least almost elliptical form of the domains has a positive effect with regard to maintaining the anisotropic properties of the plastic tape. The term "domain" is defined in this case as a discrete, delimited area in the plastic tape.

For a better understanding of the invention the latter is explained in more detail with reference to the following Figures.

Figure 1:
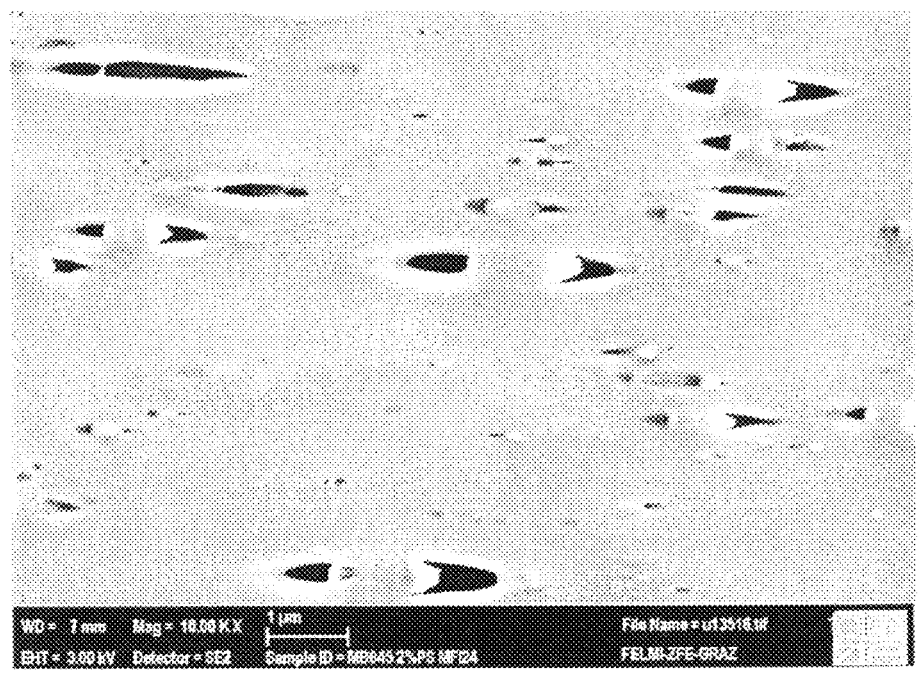
FIG. 1 shows a scanning electron microscope image of a cross section of a polyester-based strapping tape with 2 wt. % polystyrene.

Firstly, it should be noted that individual features or combination of features of the different described exemplary embodiments can represent in themselves independent solutions according to the invention.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

The strip-like packaging element according to the invention is a plastic tape and in particular a strapping tape or a harvesting twine.

The packaging element is preferably produced with a polyester base. Polyester-based is defined in the invention to mean that the strapping tape or agricultural twine or packaging element is made from a base material or matrix material consisting of at least one polyester, i.e. the polyester or the polyester mixture is the main component with a proportion of at least 50 wt. % in the packaging element. Preferably, the tape-like packaging element contains a proportion of polyester of at least 75 wt. %, in particular at least 85 wt. % or at least 90 wt. %.

The polyester used is preferably a saturated or thermoplastic polyester. As the polyester a polymer is preferably used which is selected from a group comprising or consisting of polyethylene terephthalate (PET), polybutylene terephthalate (PBT), polycarbonate (PC), polyethylene naphthalate (PEN) as well as mixtures thereof.

In addition to the polyester-based material the packaging element can also contain additional additives, such as e.g. colorants, as known from the prior art and/or inorganic fillers, such as e.g. talcum or chalk. In the preferred embodiment of the invention the polyester-based packaging element has no additional contents or additives in addition to the polyester, the thermoplastic, styrene-based polymer and a colorant.

Preferably, the tape-like packaging element made of polyester-based material does not contain any polyolefins.

In the two embodiment variants of the tape-like packaging element as a wrapping tape or agricultural twine the respective base material contains at least one thermoplastic, styrene-based polymer as a splicing inhibitor. A styrene-based polymer is defined as a polymer which is either a homopolymer or a copolymer or a mixed polymerizate, wherein in any case a styrene monomer has been used for its production.

Preferably, a polymer is used as the styrene-based polymer, which is selected from a group comprising or consisting of polystyrene-homopolymer, styrene-butadiene-copolymer (SB), acrylonitrile-butadiene-styrene copolymer (ABS), methyl-methacrylate-acrylonitrile-butadiene-styrene copolymer (MABS), styrene-acrylonitrile copolymer (SAN), acrylonitrile-styrene-acrylate copolymer (ASA), styrene-maleic acid-anhydride copolymer (SMA), acrylonitrile-ethylene-styrene copolymer (AES), acrylonitrile-chlorinated polyethylene-styrene (ACS), methyl-methacrylate-butadiene-styrene (MBS), styrene-α-methyl styrene-copolymer (SAM) as well as mixtures thereof.

In this case the latter are preferably common commercially available products, as with the polyesters and the polyolefins and the additional constituents of the packaging element.

The proportion of styrene-based polymer in the plastic tape is selected from a range with a lower limit of 0.2 wt. %, preferably 0.5 wt. %, and an upper limit of 20 wt. %, preferably 15 wt. %, in particular 3.5 wt. %.

A proportion of up to and including 80 wt. %, in particular 50 wt. %, preferably 20 wt. %, of said styrene-based polymer can however also be replaced by an additional splicing inhibitor commonly used as a splicing inhibitor in such tape-like packaging elements, which is different from the styrene-based splicing inhibitor. In particular, said additional splicing inhibitor is selected from a group comprising or consisting of olefin-acrylate copolymers, thermoplastic polymers (TPE), low density polyethylene (LDPE), linear LDPE (LLDPE), polyethylene, polypropylene, butadiene rubber (BR), as well as mixtures thereof. Preferably, the additional splicing inhibitor is included in a proportion such that the ratio of styrene-based splicing inhibitor to the additional splicing inhibitor is selected from a range of from 80:20 to 20:80, in particular 60:40 to 40:60.

For test purposes the following compositions were processed in an extrusion process into tapes or twines, the tapes having a tape width of 9 mm to 19 mm and the twines having a running length of 400 m/kg. As the production process of such tape-like packaging elements is known from the prior art, reference is made to the relevant literature for a person skilled in the art.

In the Tables:

SP is defined as styrene polymer,

Std. additive is defined as a common additive used in the prior art, as explained above,

[%] stands for wt. %.

| Test | Dimension [mm] | SP additive | Proportion SP [%] | Std. additive [%] |
|---|---|---|---|---|
| tape | 9×0.55 | PS | 2.5 | 0 |
| tape | 15×0.55 | PS | 0.5 | 0 |
| tape | 15×1 | PS | 0.01 | 0 |
| tape | 15×1 | PS | 0.02 | 0 |
| tape | 15×1 | PS | 0.04 | 0 |
| tape | 15×1 | PS | 1 | 0 |
| tape | 15×1 | PS | 2 | 0 |
| tape | 16×0.9 | PS | 2 | 0 |
| tape | 16×1.0 | PS | 2 | 0 |
| tape | 16×1.0 | ABS | 0.5 | 0 |

-continued

| Test | Dimension [mm] | SP additive | Proportion SP [%] | Std. additive [%] |
|---|---|---|---|---|
| tape | 16×1.0 | ABS | 1 | 0 |
| tape | 16×1.0 | ABS | 1.5 | 0 |
| tape | 16×1.0 | ABS | 2 | 0 |
| tape | 16×1.0 | ABS | 2.5 | 0 |
| tape | 16×1.0 | SAN | 0.5 | 0 |
| tape | 16×1.0 | SAN | 1 | 0 |
| tape | 16×1.0 | SAN | 1.5 | 0 |
| tape | 16×1.0 | SAN | 2 | 0 |
| tape | 16×1.0 | SAN | 2.5 | 0 |
| tape | 19×1.0 | PS | 0.5 | 0 |
| tape | 19×1.0 | PS | 2 | 0 |
| tape | 19×1.27 | PS | 1 | 0 |
| tape | 19×1.27 | PS | 2 | 0 |
| tape | 19×1.27 | PS | 3.5 | 0 |
| tape | 19×1.27 | PS | 1 | 1 |
| tape | 19×1.27 | PS | 1.5 | 0.5 |
| tape | 19×1.27 | PS | 2.25 | 0.75 |

| Test | Running meters [m/kg] | SP additive | Proportion SP [%] |
|---|---|---|---|
| twine | 400 | PS | 1 |
| twine | 400 | PS | 2 |
| twine | 400 | PS | 5 |

In the preferred embodiment of the tape-like packaging element at least one proportion of 90%, in particular 95%, preferably 99%, of the total proportion of styrene-based splicing inhibitor, preferably at least almost 100%, is unattached and/or domain-like in the plastic tape, as shown in FIG. 1, which shows a strapping tape with the composition 98 wt. % PET and 2 wt. % PS. This is achieved in that the compound to produce the packaging element is processed at a temperature of between 250° C. and 310° C., in particular between 270° C. and 300° C.

Figure 2:
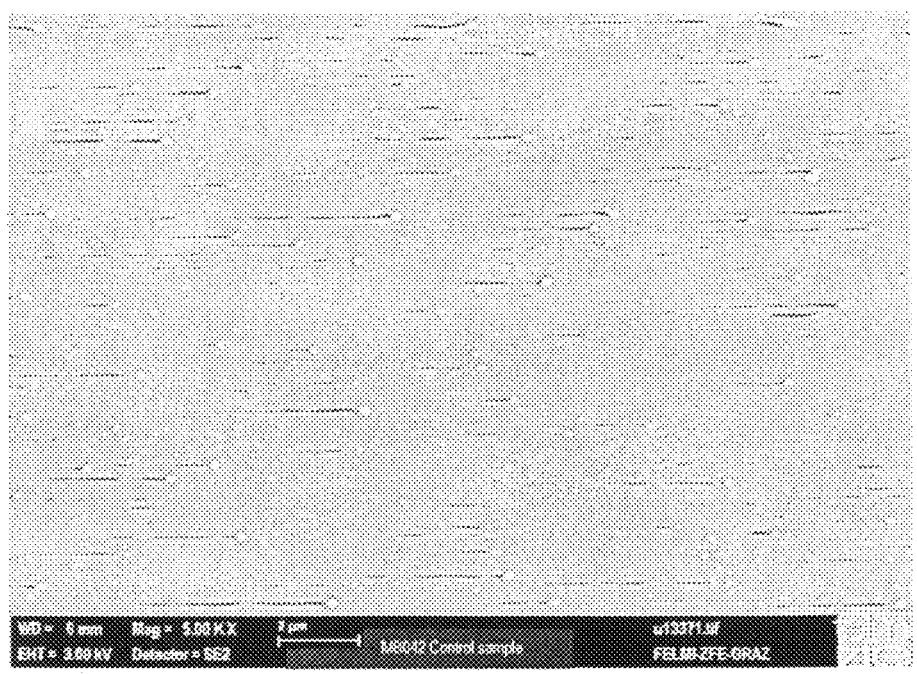
FIG. 2 shows a scanning electron microscope image of a cross section of a polyester-based strapping tape without the additive according to the invention of a thermoplastic styrene polymer.

In contrast FIG. 2 shows a scanning electron microscope image of a PET tape without the addition of a thermoplastic, styrene-based splicing inhibitor. In this way the difference from the packaging element according to the invention is clarified. It can be seen that in this case also domains are formed (white points) which are formed by part-crystalline areas of the PET.

One embodiment is particularly preferable in which the domains are stretched in one direction, as shown in FIG. 1. In addition, the stretching in at least one spatial direction of the domains was achieved by using stretching devices or stretching ovens. Preferably, the stretching of the domains in one spatial direction is performed to produce an at least almost elliptical cross section.

For the representations in FIGS. 3 and 4 for different polyester-based strapping tapes with different proportions of polystyrene or without such splicing inhibitors or with commonly available standard additives (the data below the bars on the x-axis are defined in wt. % and the abbreviation "Std" stands for a commonly available standard additive and "Sty" stands for polystyrene) splicing was provoked by mechanical pressure loading transversely to the direction of extension at a temperature of −5° C. (FIG. 3) or −15° C. (FIG. 4). This was performed multiple times on each tape (40-60 times). The proportion of loading incidents in which splicing actually occurred was evaluated as "low".

Figure 3:
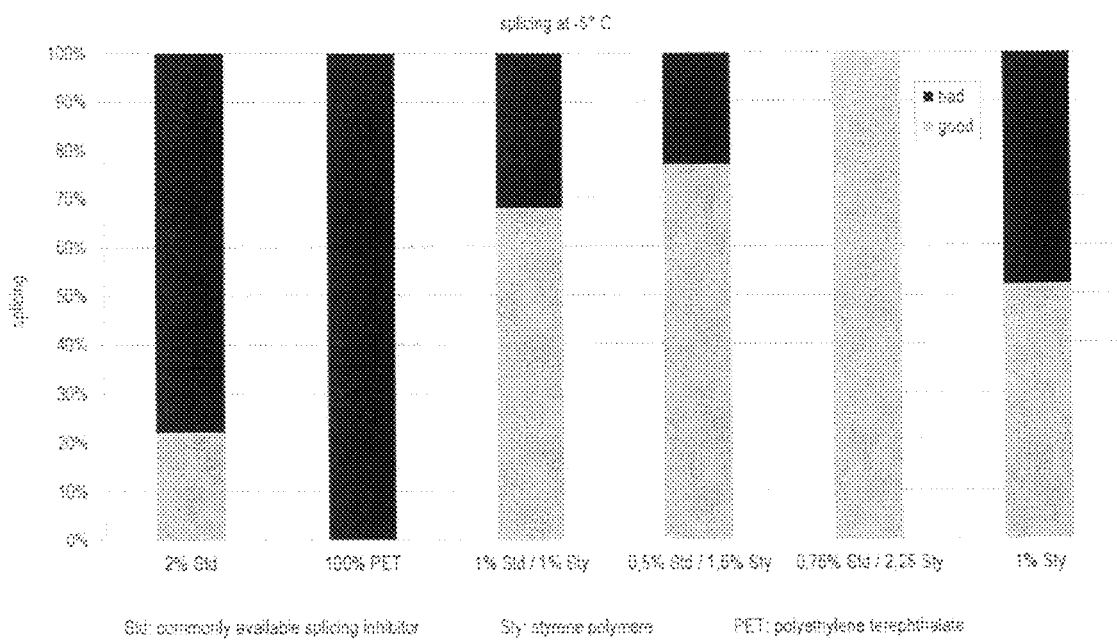
FIG. 3 shows a graphic representation of the splicing tendency of different strapping tapes at −5° C.
Figure 4:
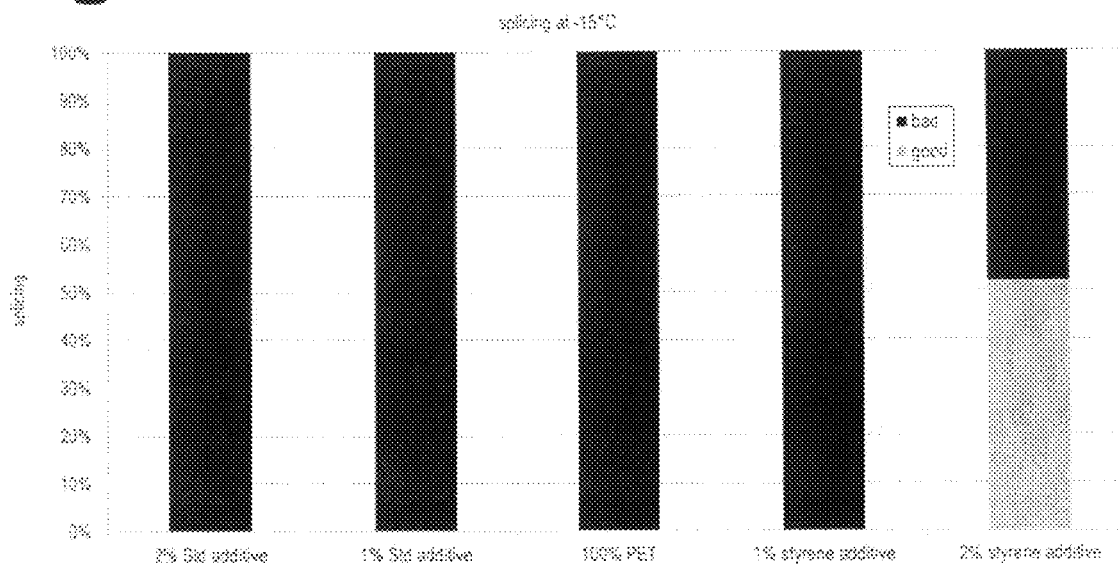
FIG. 4 shows a graphic representation of the splicing tendency of different strapping tapes at −15° C.

In FIG. 3 in addition to pure additives also combinations of commonly available splicing inhibitors and PS were added to the PET, in FIG. 4 only pure additives.

As shown in FIG. 3, an additive of 1 wt. % PS has a much greater splicing inhibiting effect than the 2 wt. % additive of the prior art splicing inhibitor. In tapes with combinations of the prior art additive and PS the resistance to splicing increases in these environmental conditions with an increasing proportion of PS.

FIG. 4 shows that at the very low temperature of −15° C. for this application with 2 wt. % PS the splicing tendency can be considerably reduced. The additive from the prior art has no more effect in these conditions.

The exemplary embodiments show and describe possible embodiment variants of the tape-like packaging element, and it should be noted at this point that the invention is not restricted to these particular embodiment variants, but rather various different combinations of the individual embodiment variants are possible and this variability owing to the teaching on technical procedure provided in the present invention should lie within the ability of a person skilled in the art in this technical field.

The invention claimed is:

1. A tape-like packaging element made from a polyester-based plastic tape, the plastic tape comprising at least one splicing inhibitor, wherein the at least one splicing inhibitor comprises a first splicing inhibitor which is a non-elastomeric, thermoplastic, styrene-based polymer comprising styrene, and at least one additional different splicing inhibitor, wherein the polyester-based packaging element contains less than 0.2 wt. % polyolefin contributed by the at least one additional different splicing inhibitor.

2. The packaging element as claimed in claim 1, wherein the splicing inhibitor is selected from the group consisting of polystyrene-homopolymer, styrene-butadiene copolymer, acrylonitrile-butadiene-styrene copolymer, methyl-methacrylate-acrylonitrile-butadiene-styrene copolymer, styrene-acrylonitrile copolymer, acrylonitrile-styrene-acrylate copolymer, styrene-maleic acid anhydride copolymer, acrylonitrile-ethylene-styrene copolymer, acrylonitrile-chlorinated polyethylene-styrene, methyl-methacrylate-butadiene-styrene, styrene-α-methyl-styrene copolymer as well as mixtures thereof.

3. The packaging element as claimed in claim 1, wherein the proportion of styrene-based polymer in the plastic tape is selected from a range with a lower limit of 0.2 wt. % and an upper limit of 20 wt. %.

4. The packaging element as claimed in claim 1, wherein the polyester is a thermoplastic polyester.

5. The packaging element as claimed in claim 4, wherein the thermoplastic polyester is selected from the group consisting of polyethylene terephthalate, polybutylene terephthalate, polycarbonate, polyethylene naphthalate as well as mixtures thereof.

6. The packaging element as claimed in claim 1, wherein the proportion of the polyester in the plastic tape is at least 50 wt. %.

7. The packaging element as claimed in claim 1, wherein the additional splicing inhibitor is selected from the group consisting of olefin-acrylate copolymers, thermoplastic copolymers, low density polyethylene, linear LDPE, polyethylene, polypropylene, butadiene rubber, and mixtures thereof.

8. The packaging element as claimed in claim 1, wherein the proportion of additional splicing inhibitor is such that the ratio of the styrene-based splicing inhibitor to the additional splicing inhibitor is selected from a range of from 80:20 to 20:80.

9. The packaging element as claimed in claim 1, wherein the styrene-based polymer in the plastic tape is unattached and/or domain-like.

10. The packaging element as claimed in claim 9, wherein binding forces between the domain and a surrounding matrix are weaker than binding forces within the matrix and within the domain.

11. The packaging element as claimed in claim 9, wherein the domains are designed to be stretched in at least one spatial direction.

12. The packaging element as claimed in claim 9, wherein the domains have an elliptical cross section in at least one spatial direction.

13. The packaging element as claimed in claim 1, wherein the packaging element is strapping tape or harvesting twine.

14. The packaging element as claimed in claim 1, wherein the proportion of styrene-based polymer in the plastic tape is selected from a range with a lower limit of 0.2 wt. % and an upper limit of 5 wt. %.

15. The packaging element as claimed in claim 1, wherein the polyester is a saturated polyester.

16. The packaging element as claimed in claim 1, wherein the at least one additional different splicing inhibitor is completely polyolefin-free.

* * * * *

UNITED STATES PATENT AND TRADEMARK OFFICE
CERTIFICATE OF CORRECTION

| | | |
|---|---|---|
| PATENT NO. | : 8,859,682 B2 | Page 1 of 1 |
| APPLICATION NO. | : 13/135101 | |
| DATED | : October 14, 2014 | |
| INVENTOR(S) | : Krziwanek et al. | |

It is certified that error appears in the above-identified patent and that said Letters Patent is hereby corrected as shown below:

On the title page, column 1, item [73], please change "(AU)" to correctly read:

--(AT)--.

Signed and Sealed this
Tenth Day of February, 2015

Michelle K. Lee
*Deputy Director of the United States Patent and Trademark Office*